Patented July 26, 1938

2,125,226

UNITED STATES PATENT OFFICE 2,125,226

RECOVERY OF TYPE METAL AND SIMILAR ALLOYS

Hans Arne Gösta Gunnelius and Nils Halvard Liander, Stockholm, Sweden

No Drawing. Application January 21, 1938, Serial No. 186,248. In Sweden May 19, 1937

6 Claims. (Cl. 75—24)

The present invention relates to an improved process for the recovery of type-metal and similar alloys.

In the re-casting of type-metal, the composition of which generally varies within the limits 55–90% lead, 5–26% antimony, 2–34% tin, and 0–5% copper, a certain amount of slag, so called ash or dross, is always encountered. The general contention has been that this ash chiefly consists of oxides of those metals which are contained in the alloy, sometimes also with the addition of oxides of copper and zinc derived from brass electrotypes, oxides of nickel from nickel plated electrotypes, etc. This dross is generally collected and the metal recovered by reduction, e. g. by means of a fusion with charcoal and soda ash. This process of reduction, however, is a fairly complicated and tedious process, which as a rule cannot be carried out in the printing or type-casting shops, or in the stereotyping establishments. The dross, is, therefore, at present as a rule either sold or sent out for regeneration which has to be paid for.

According to prevent invention it is, however, possible to recover the greater part of the metals contained in the dross, by means of a smelting procedure which may be carried out in any printing shop, etc. Contrary to all belief, the oxide content of the dross is, in fact, very small. The rest consists of droplets of metal, which, owing to a thin coating of oxide, have not become fused together and alloyed with the molten metal, and which, therefore, are removed with the skimmings from the melting pot together with the impurities. These inclusions of metal are easily recovered if the film of oxide on the droplets is removed, which may be effected by employing any suitable oxide dissolving salt. Our investigations, however, have demonstrated that of the various salts which may be considered for this purpose and which, unlike cyanides which are less suitable for use in printing shops and the like owing to the danger of poisoning, zinc chloride in particular yields results of a practical value. When employing this latter compound about 90–95% of the dross may be extracted and recovered in the form of metal.

In carrying out the process according to the invention it is sufficient to add zinc chloride to the dross in the melting pot, and to fuse the mixture while stirring. In this case there is generally only required about 5–10% by weight of zinc chloride, calculated on the amount of dross. In general, quantities of from 1 to 30% by weight of zinc chloride in the total mixture are found suitable. The salt will rise to the surface of the molten mixture carrying with it oxides and other impurities, and it is possible after only a few minutes to pour the pure metal from the pot. A better procedure is, however, to cause the dross to pass downwardly through a molten salt bath, whereby a much more efficient purification of the metal is obtained. It is important that the temperature during the fusing is not kept too high, at any rate not above 500–600° C., since at higher temperatures, the separation of the salt from the molten metal will become unsatisfactory. A mixture of zinc chloride with one or more salts having a low fusing point, e. g. sodium bisulfate, may thus also be used to advantage in the process.

We claim:

1. A process for the recovery of type-metal comprising lead, antimony and tin from dross formed in the re-casting of said metal, consisting in fusing the dross with oxide dissolving salts comprising zinc chloride and collecting the purified metal thus formed.

2. A process for the recovery of lead-antimony-tin alloys from dross formed in the casting of said alloys, comprising the step of fusing the dross with zinc chloride.

3. A process for the recovery of type-metal comprising lead, antimony and tin from dross consisting in fusing the dross with a mixture of zinc chloride and a salt having a low fusing point.

4. A process as claimed in claim 3 in which the dross is fused with a mixture of zinc chloride and sodium bisulfate.

5. A process for the recovery of alloys chiefly containing lead, antimony and tin from dross formed in the melting and casting of said alloys, comprising fusing the dross in a bath containing zinc chloride at a temperature not exceeding 600° C.

6. In the recovery of metal values from dross containing lead, antimony and tin, the process which comprises contacting said dross with fused zinc chloride at a temperature ranging from about 500° to 600° C., the quantity of zinc chloride employed amounting to from about 1 to 30 per cent by weight, based on the weight of the dross.

HANS ARNE GÖSTA GUNNELIUS.
NILS HALVARD LIANDER.